Figure 1:
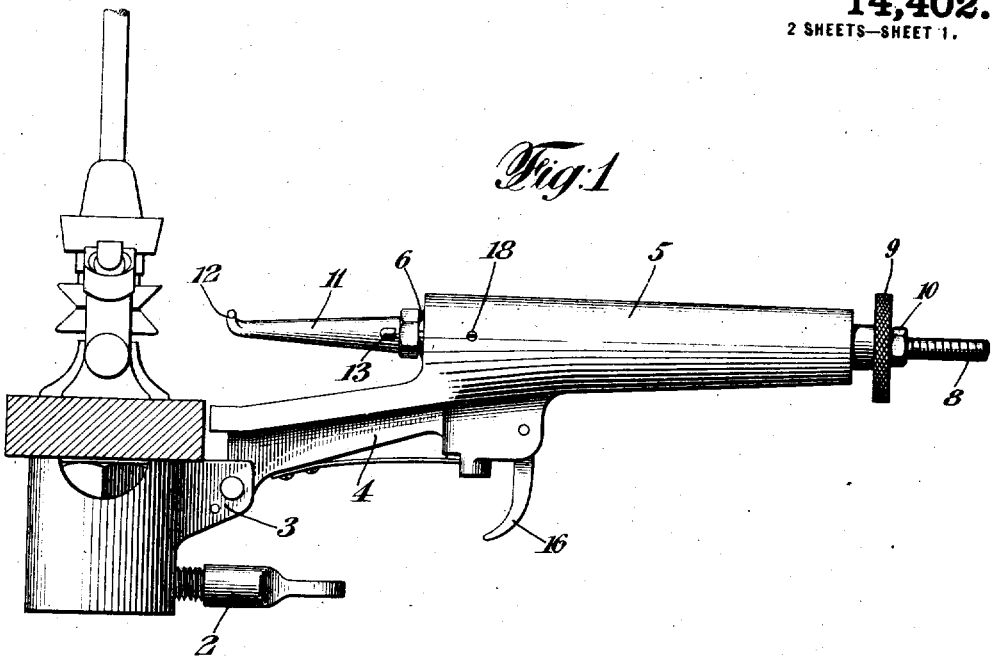

M. CURRY & A. COOK.

BAND TYING GAGE.

APPLICATION FILED NOV. 16, 1916.

Reissued Dec. 4, 1917.

14,402.

2 SHEETS—SHEET 1.

Inventors

Malcolm Curry & Albert Cook,

By their Attorneys

Davis & Davis

M. CURRY & A. COOK.

BAND TYING GAGE.

APPLICATION FILED NOV. 16, 1916.

Reissued Dec. 4, 1917.

14,402.

2 SHEETS—SHEET 2.

Inventors,

Malcolm Curry & Albert Cook,

By their Attorneys

Davis & Davis

UNITED STATES PATENT OFFICE.

MALCOLM CURRY, OF HOLYOKE, AND ALBERT COOK, OF FALL RIVER, MASSACHUSETTS.

BAND-TYING GAGE.

14,402. Specification of Reissued Letters Patent. Reissued Dec. 4, 1917.

Original No. 1,193,668, dated August 8, 1916, Serial No. 44,170, filed August 7, 1915. Application for reissue filed November 16, 1916. Serial No. 131,796.

*To all whom it may concern:*

Be it known that we, MALCOLM CURRY and ALBERT COOK, citizens of the United States, and residents of Holyoke, county of Hampden, State of Massachusetts, and of Fall River, county of Bristol, State of Massachusetts, respectively, have invented certain new and useful Improvements in Band-Tying Gages, of which the following is a specification.

This invention relates to a device adapted for use in tying the spindle driving bands on spinning or twisting frames, or other band driven machinery.

As now commonly tied, the operative depends upon his sense of feel in determining the proper tension to be placed on the bands, and although these operatives become very skillful there is a great variation in the tension of the banding. Tests have shown tension variations of from one-half pound to ten or eleven pounds between the various bands on a hand-banded spinning machine. It is obvious that this variation in band tension results in bands which have an insufficient tension and others which have an excessive tension. Insufficient tension results in a failure to maintain the proper speed of rotation of the spindle, or the throwing-off of the band; and excessive tension results in broken bands, excessive slip due to friction, excessive wear in the spindle bearings and an excessive load on the machine. The variation in the banding also results in a non-uniform product; and it will be readily appreciated that broken bands due to excessive strain result in wastages of banding, delays in operation and much damage to the product, due to the flying ends of the broken bands.

It is the main object of this invention to provide a device which will enable the operative to tie all bands with a uniform tension, the device being adjustable so that when tied the bands will have the desired tension. It is manifest that in a spinning or twisting frame in which all of the bands have a uniform tension, the product will be uniform; the load on the machine will be reduced to a minimum; and that the spindles will have a uniform speed and a substantially uniform wear in their bearings. There will thus result a saving in maintenance of machinery, a saving in handling and a maximum amount of production of a uniform product.

A further object of the invention is to provide a device which automatically will become locked when the proper tension is secured on the band to thereby relieve the partially tied band of the regulating tension and permit the operative to use both hands freely in the tying operation, which may then be easily and accurately completed without danger of lessening or increasing the tension.

Another object of the invention is to provide means whereby the tied band may be readily released from the tying device and delivered to the whorl of the spindle, the tension regulating device being then released so that it may return to its normal position ready for the next tying operation.

There are other objects and advantages of the invention, all of which will be more fully hereinafter set forth.

Figure 2:
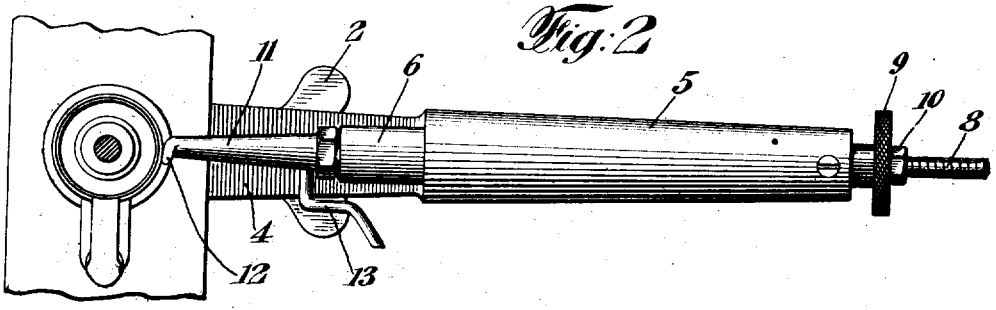
Figure 3:
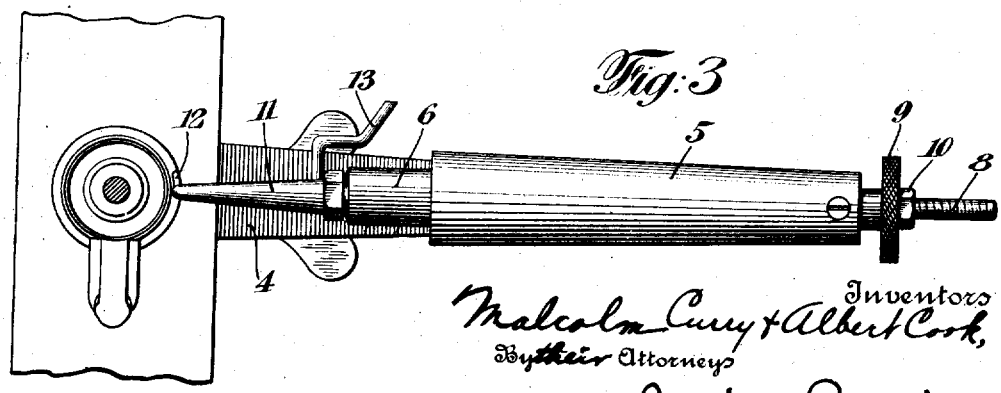
Figure 4:
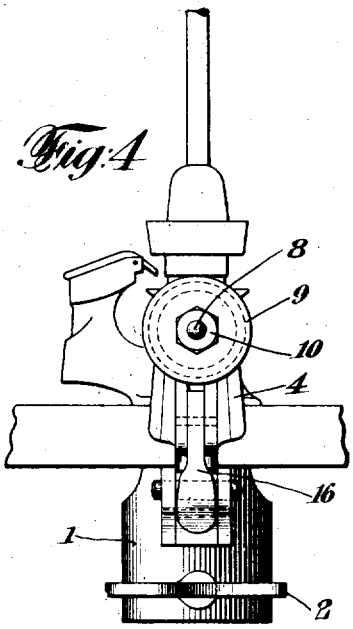
Figure 6:
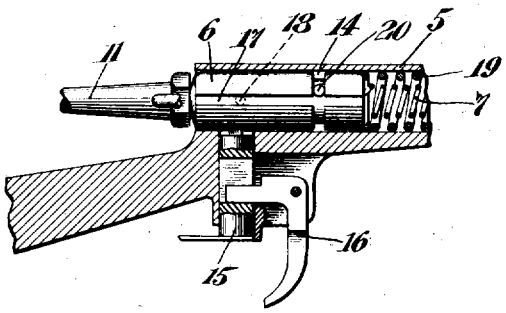
Figure 5:
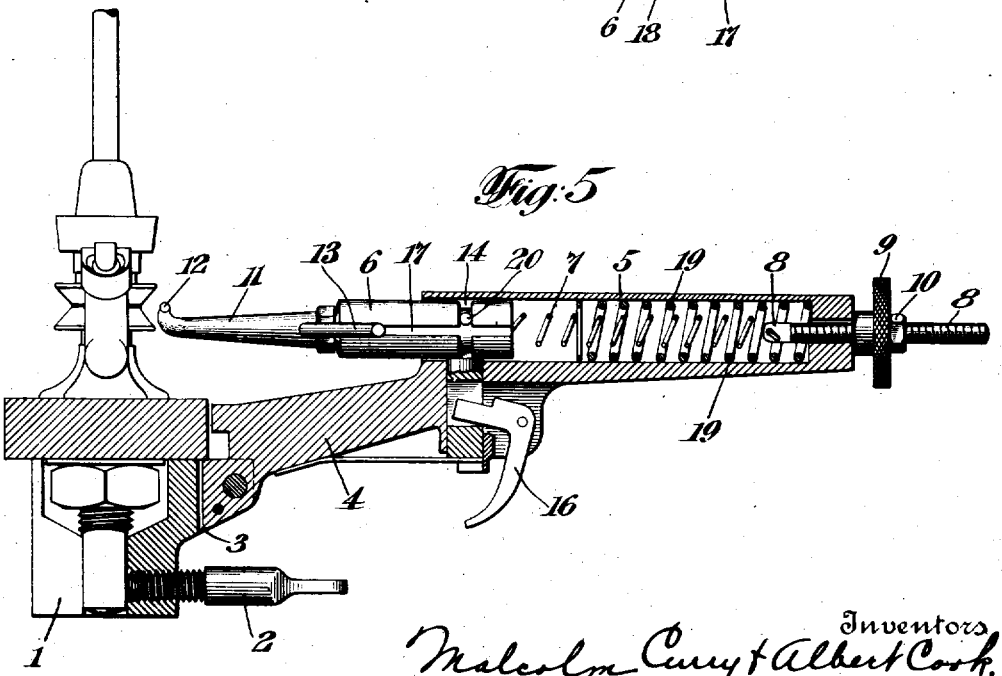

In the drawings, Figure 1 is a side elevation of the device applied and showing a spindle rail and a spindle mounted thereon; Fig. 2 a plan view; Fig. 3 a plan view showing the plunger and knot-tying member rotated to release the tied band; Fig. 4 a front elevation; Fig. 5 a longitudinal vertical sectional view of the complete device; Fig. 6 a detail longitudinal sectional view with the plunger in its normal position; and Fig. 7 a detail horizontal sectional view with the plunger in its normal inner position.

Referring to the various parts by numerals, 1 designates a socket or cup which is adapted to receive the bolster of the spindle. This cup is provided near its lower end with a clamping screw 2, the inner end of which is adapted to engage the bolster to securely clamp the socket in position on the bolster. Rigidly connected to the socket and extending forwardly therefrom is a supporting arm 3. In the upper end of this arm is rigidly secured a frame 4 which carries a cylinder or barrel 5, the axis of said barrel being perpendicular to the axis of the socket, and substantially horizontal. In the cylinder is mounted a plunger 6 which fits snugly therein and is yieldingly held by means of a coil spring 7. This spring is attached to the plunger and to an adjusting screw 8 which extends through the outward end of the cylinder. On the projecting end of this screw is threaded an adjusting nut 9 and a lock nut 10. By means of the adjusting nut 9 the screw 8 may be moved and the tension of the spring on the plunger increased or diminished, with the result that more or less pull will be required to withdraw the plunger from the cylinder. A tying rod 11 is rigidly connected to the inner end of the plunger and projects toward the extended center line of the socket; and the inner end of this rod is formed into a laterally extending hook 12. Connected to the rod 11 near the plunger 6 is a finger piece or handle 13 by means of which the plunger may be partially rotated in its cylinder.

In the plunger near its inner end is formed an annular groove or channel 14; and carried by the frame and extending into the cylinder is a spring-pressed locking dog 15 which is adapted to snap into the channel 14 when the plunger has been drawn rearwardly out of the cylinder sufficiently to bring the said groove into position to receive the said dog. The dog 15 is adapted to hold the plunger rigidly and to relieve it of the tension of the spring. The purpose of the groove is to permit the plunger to be partially rotated by means of the finger piece or handle, while the said plunger is held in its locked position. Pivoted in the frame and extending forwardly thereof is a releasing trigger 16, the lower projecting end of which is adapted to be engaged by a finger of the operative, a forward pull on said trigger withdrawing the locking dog from the groove in the plunger. The upper end of the releasing trigger is operatively connected to the locking dog, as shown, for that purpose. The plunger 6 is provided with a longitudinally extending groove or channel 17 into which projects a guide lug 18 to prevent the plunger rotating until the locking dog 15 is in the annular channel 14. Within the cylinder and serving as a stop to limit the inward movement thereof is arranged a coil spring 19. This spring forms a resilient recoil check for the plunger when it is snapped inwardly by the tension spring 7 after the locking dog is released. It will be readily understood that this recoil check may be of any suitable form. This stop forms an abutment against which the inner end of the plunger rests while adjusting the tension of the coil spring 7.

Figure 7:
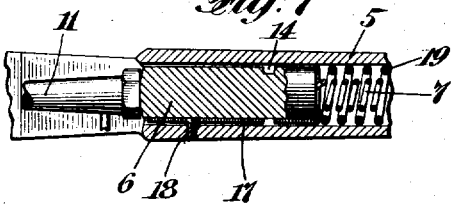

In the groove 14 is a stop pin 20, said pin being located at one side of the longitudinal groove 17, as shown clearly in Figs. 5 and 7. This stop pin is adapted to contact with the pin 18 when the plunger is locked in its outer position, as in Figs. 1 to 3 inclusive, to hold the plunger against rotation in one direction. This stop pin is also adapted to contact with the dog 15 when the plunger is rotated to release the tied band. In returning the plunger to bring the slot 17 in line with the stop pin 18 the stop 20 serves as a guide and contacts with the pin 18 when the slot 17 is in register with the latter pin. These, of course, are details of construction which may be varied as desired.

It will, of course, be readily understood that the socket and the frame may be formed in one piece if desired; and that any form of tension device may be connected to the inner end of the plunger. It will also be understood that any form of support may be employed and that the supporting frame may be detachably connected to any part of the spinning frame or twisting frame instead of being connected to the spindle bolster. All of these details may be varied to suit varying conditions and different types of machines to be banded.

In the band tying operation the device is used substantially as follows: As heretofore set forth, the socket 1 is placed over the spindle base or bolster under the spindle rail, the upper edge of the socket being brought into engagement with the rail, and the clamping screw 2 being screwed inwardly to tightly clamp the socket in position. The plunger is in its normal inner position. The band to be tied is brought around the hook on the end of the rod 11, and the first part of the knot is formed. This knot is then drawn tightly, and sufficient tension is put thereon to pull the plunger rearwardly against the spring 7. This pull is gradually increased until the plunger has been drawn out of its cylinder, sufficiently to bring the annular groove 14 into position to receive the locking dog. When the locking dog has snapped into the groove in the plunger the desired tension has been placed upon the band and the tying operation may then be completed. By locking the plunger, as hereinbefore set forth, the band is relieved of the spring tension and the tying operation may be completed without losing or releasing any of the tension already placed on the band, and also without increasing the band tension. When the band is tied and the loose ends clipped off, the cylinder is partially rotated by means of the finger piece or handle 13, and this rotation releases the hook 12 from the tied band and delivers the band to the spindle whorl. The plunger cannot be drawn into its cylinder until it has been rotated and returned to its normal position to bring the groove 17 into position to receive the guide pin 18.

In adjusting the device to the spindle bolster, care is taken to bring the frame into such position that when the plunger is drawn outwardly in the operation of tying the band, the hook on the end of the tying rod will be brought quite close to the spindle whorl so that when the band is released from the hook it will drop into the groove of the whorl. This operation of transferring the band from the hook to the whorl will necessarily slightly reduce the tension on the band, but this reduction in tension may be provided for by adjusting the spring attached to the plunger, so that when the band is finally landed in the spindle whorl it will have the desired pull.

As heretofore pointed out, the advantages of banding all of the spindles in a frame at a uniform and minimum tension, are very great and will readily be appreciated by those familiar with the operation of twisting frames and spinning frames, and it is not necessary to fully enumerate them herein.

What we claim is:

1. A band tying gage comprising a support, a yieldably mounted tying rod carried by said support and over which the band is to be tied, and means for automatically locking said tying rod in a predetermined relation to the support when a predetermined tension on the band has been reached.

2. A band tying gage comprising a support, a yieldably mounted device carried by said support and over which the band is to be tied, and means for locking said yieldably mounted device in a fixed relation to the support when a predetermined strain has been placed thereon during the band tying operation.

3. A band tying gage comprising a support, a yieldably mounted device carried by said support and over which the band is to be tied, and means for locking said yieldably mounted device against longitudinal movement in either direction when a predetermined strain has been placed thereon during the band tying operation.

4. A band tying gage comprising a support, a yieldably mounted device carried by said support and over which the band is to be tied, means for locking said yieldably mounted device in a fixed relation to the support when a predetermined strain has been placed thereon during the band tying operation, and means for releasing the said locking device.

5. A band tying gage comprising a support, a yieldably mounted device carried by said support and over which the band is to be tied, said device being adapted to yield to the tension placed on the band, and means for automatically locking said yieldable device against longitudinal movement in a fixed relation to the support when a predetermined strain has been placed thereon in the band tying operation.

6. A band tying gage comprising a support, a yieldably mounted device carried by said support and over which the band is to be tied, said device being adapted to yield to the tension placed on the band, means for automatically locking said yieldable device in a fixed relation to the support when a predetermined strain has been placed thereon in the band tying operation, and means for releasing the said locking device.

7. A band tying gage comprising a support, a yieldably mounted device carried by said support and over which the band is to be tied, means for locking said yieldably mounted device when a predetermined strain has been placed thereon during the band tying operation, and means to permit said yieldable device to be rotated in its locked position to release the tied band.

8. A band tying gage comprising a support, a yieldably mounted device carried by said support and over which the band is to be tied, said device being adapted to yield to the tension placed on the band, means for automatically locking said yieldable device when a predetermined strain has been placed thereon in the band tying operation, and means to permit said yieldable device to be rotated in its locked position to release the tied band.

9. A band tying gage comprising a support, a yieldably mounted device carried by said support and over which the band is to be tied and adapted to be moved toward the spindle by the strain on the band, means to prevent the rotation of said device during its movement toward the spindle, means for automatically locking said yieldable device at a predetermined point in its movement, and means to permit the rotation of said device in its locked position to release the tied band.

10. A band tying gage comprising a support, a yieldably mounted device carried by said support and over which the band is to be tied and adapted to be moved toward the spindle by the strain on the band, means to prevent the rotation of said device during its movement toward the spindle, means for automatically locking said yieldable device at a predetermined point in its movement, and means to release the tied band when the yieldable tying device is in its locked position.

11. A band tying gage comprising a support, a yieldably and rotatably mounted device carried by said support, a hook formed on the end of said device and over which the band is to be tied, whereby the rotation of said device will release the tied band.

12. A band tying gage comprising a support, a yieldably mounted device carried by said support and over which the band is to be tied, said device being provided with a laterally extending hook at its end to receive the band, and means for rotating the yieldable device to withdraw the hook from the tied band.

13. A band tying gage comprising a support, a yieldably mounted device carried by said support directly forward of the spindle in substantially the same horizontal plane as the spindle whorl, said device being longitudinally movable toward the spindle whorl under the strain of the band, and means whereby the tied band may be released from the yieldable device and deposited on the spindle whorl.

14. A band tying gage comprising a support, a yieldably mounted tying rod carried by said support forward of the spindle whorl and in substantially the same horizontal plane therewith, a laterally extending hook on the end of said tying rod, and means for rotating said rod to release said hook from the tied band.

15. A band tying gage comprising a socket adapted to receive a spindle bolster, a clamping screw in said socket, a cylinder carried by said socket, a yieldable plunger in said cylinder, a tying rod connected to the rear end of said plunger and provided with a laterally extending hook at its rear end, a tension device within the cylinder and connected to the plunger, and means for automatically locking the plunger at a predetermined point in its movement.

16. A band tying gage comprising a frame, means for supporting said frame, a rearwardly movable plunger mounted in said frame, a spring connected to the inner end of said plunger, means for varying the tension of said spring, a laterally extending hook carried by the plunger, means for automatically locking the plunger at a predetermined point in its movement, means for rotating said hook to release the tied band, and means for releasing the locking device.

17. A band tying gage comprising a frame, means for supporting said frame, a plunger mounted in said frame forward of the spindle, a spring connected to said frame and normally drawing the plunger forwardly, means for varying the tension of said spring on the plunger, means to prevent the rotation of the plunger during its rearward movement toward the spindle, means for automatically locking the plunger at a predetermined point in its rearward movement, means to permit the rotation of the plunger in its locked position, a band tying rod connected to the rear end of the plunger, a laterally extending hook formed on the end of said rod, said hook being adapted to lie in substantially the same horizontal plane as the spindle whorl and to be brought close to the forward edge of said whorl during the band tying operation, whereby upon the rotation of said hook the tied band will be deposited on the spindle whorl.

18. A band tying gage comprising a frame, a support therefor, a yieldably mounted tying device in said frame, a locking dog adapted to automatically lock said device at a predetermined point in its movement and to hold said device against longitudinal movement and in a fixed relation to the support and a downwardly extending trigger device and to release the locking dog.

19. A band tying gage comprising a support, a yieldably mounted device over which the band is to be tied, means for automatically locking said yieldable device in a fixed relation to the support when a predetermined strain has been placed thereon during the band tying operation and to hold said device against longitudinal movement, means for releasing the said locking device, and means for arresting the movement of said yieldably mounted device after the locking means is released.

20. A band tying gage comprising a support, a yieldably mounted tying rod carried by said support and over which the band is to be tied, and means for automatically locking said tying rod against longitudinal movement in either direction when a predetermined tension on the band has been reached.

21. A band tying gage comprising a support, a yieldably mounted device carried by said support and over which the band is to be tied, means for locking said yieldably mounted device against longitudinal movement in either direction when a predetermined strain has been placed thereon during the band tying operation, and means for releasing the said locking device.

22. A band tying gage comprising a support, a yieldably mounted device carried by said support and over which the band is to be tied, said device being adapted to yield to the tension placed on the band, means for automatically locking said yieldable device against longitudinal movement in either direction when a predetermined strain has been placed thereon in the band tying operation, and means for releasing the said locking device.

23. In a band tying gage, the combination of a spindle carrying a whorl, a support, a yieldably mounted device carried by said support and over which the band is to be tied, said device being adapted to be moved toward the spindle by the strain on the band, and means for automatically locking said yieldable device in a fixed relation to the whorl.

24. In a band tying gage the combination of a spindle carrying a whorl, a support, a cylinder carried by said support, a yieldable plunger in said cylinder, a tying device carried by said plunger and over which the band is to be tied, a tension device within the cylinder and operating on the plunger, and means for automatically locking the plunger in a fixed relation to the whorl.

25. In a band tying gage, the combination of a spindle carrying a whorl, a support, a yieldably mounted device carried by said support and over which the band is to be tied, said device being adapted to be moved toward the spindle by the strain on the band, means for automatically locking said yieldable device in a fixed relation to the whorl, and means for varying the tension on the yieldably mounted device.

26. In a band tying gage the combination of a spindle carrying a whorl, a support, a cylinder carried by said support, a yieldable plunger in said cylinder, a tying device carried by said plunger and over which the band is to be tied, a tension device within the cylinder and operating on the plunger, means for automatically locking the plunger in a fixed relation to the whorl, and means for varying the tension of the tension device.

27. A band tying gage comprising a support, a yieldable mounted device carried by said support and over which the band is to be tied, means for locking said yieldably mounted device in a fixed relation to the support, and means for varying the tension on the yieldably mounted device without varying the locking position of the said device.

28. An apparatus for the purpose set forth comprising a supporting frame constructed to engage a spindle mounting, means for locking said frame to said mounting, means on said frame to engage a band while the ends of the same are being united, and means for releasing the band after the ends are united to permit the same to engage a spindle whorl.

29. A device for the purpose set forth, comprising a support adapted to engage a spindle mounting, means for locking said support to said mounting, yieldable means on said support adapted to be engaged by a band while the ends of the same are being united, and means for releasing the tied band to engage the spindle whorl.

In testimony whereof we hereunto affix our signatures.

MALCOLM CURRY.
ALBERT COOK.

Copies of this patent may be obtained for five cents each, by addressing the "Commissioner of Patents. Washington, D. C."